No. 714,245. Patented Nov. 25, 1902.
F. J. SCHÜRMANN.
BICYCLE SADDLE CLOTH.
(Application filed June 3, 1901.)
(No Model.)

Witnesses:
Emil Kayser
Arthur Scholtz

Inventor
Felix Joseph Schürmann
by
Attorney.

UNITED STATES PATENT OFFICE.

FELIX JOSEPH SCHÜRMANN, OF MÜNSTER, GERMANY.

BICYCLE SADDLE-CLOTH.

SPECIFICATION forming part of Letters Patent No. 714,245, dated November 25, 1902.

Application filed June 3, 1901. Serial No. 63,009. (No model.)

*To all whom it may concern:*

Be it known that I, FELIX JOSEPH SCHÜRMANN, a subject of the King of Prussia, German Emperor, and a resident of Münster, in the Province of Westphalia, German Empire, have invented certain new and useful Improvements in Bicycle-Saddles, of which the following is an exact specification.

My invention relates to improvements in bicycle-saddles, and has especially for its purpose to provide a saddle-covering by means of which it is attained that the rider cannot slide onto the fore part of the saddle, so avoiding the most uncomfortable and unhealthy riding of the same on this small fore part of the saddle. I attain this object by the saddle-cloth illustrated in the accompanying drawings, in which—

Figure 1:
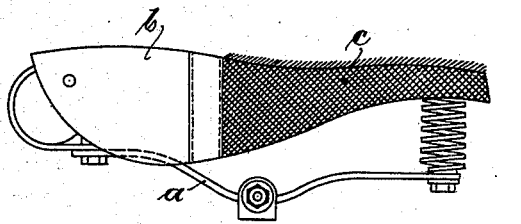
Figure 2:
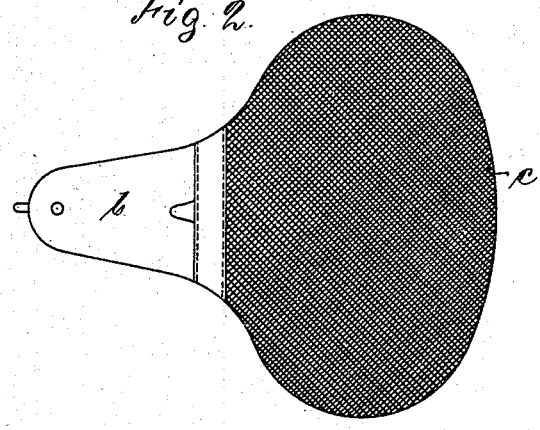

Figure 1 is a side view of a saddle provided with my new covering. Fig. 2 is an upper view of the same.

In the drawings, $a$ denotes the saddle-spring. $b$ is the saddle proper. $c$ is the new saddle-cloth. This cloth $c$ is provided with naps or piles, which are inclined toward the rear of the saddle. Hereby it is attained that a sliding of the rider onto the fore part of the saddle is avoided and a good seat of the same is insured.

Having thus fully described the nature of my invention, what I desire to secure by Letters Patent of the United States is—

A bicycle-saddle having a covering of pile fabric secured thereto, the pile fibers being inclined toward the rear of the saddle, substantially as described.

In testimony whereof I have signed my name to this specification in the presence of two subscribing witnesses.

FELIX JOSEPH SCHÜRMANN.

Witnesses:
 WM. ESSENWEIN,
 ANTON BRIGGEMANN.